United States Patent Office 3,732,171
Patented May 8, 1973

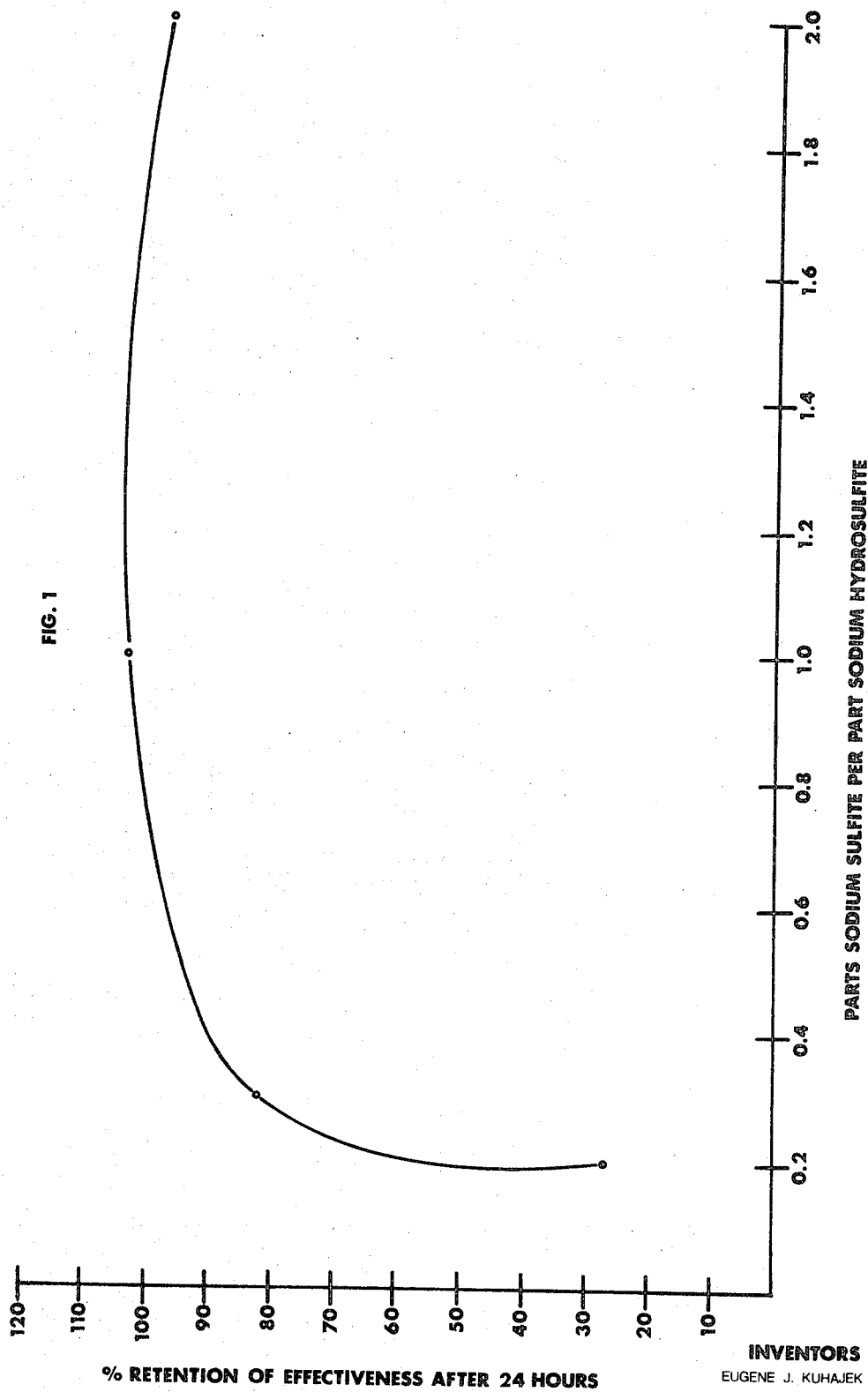

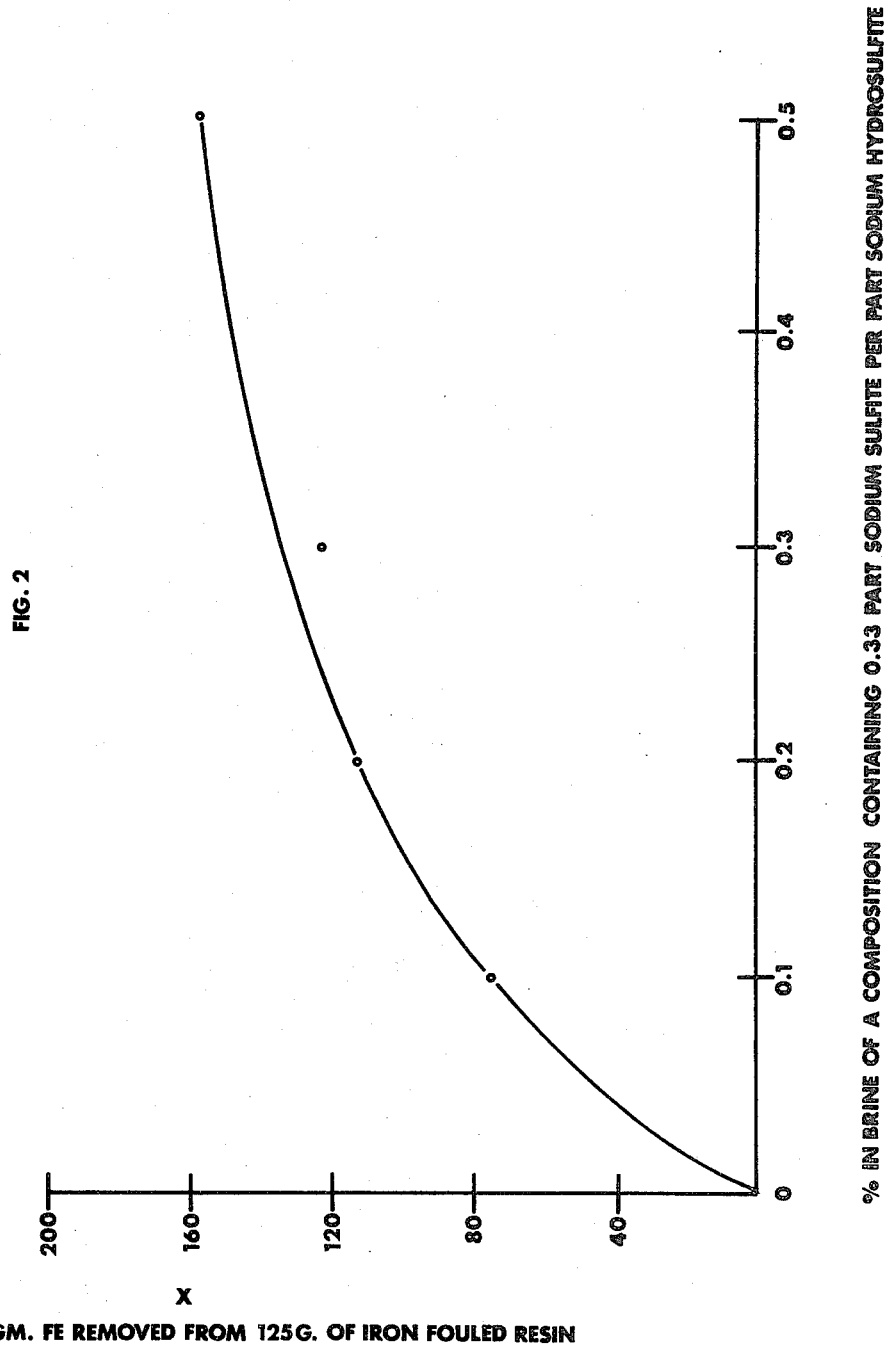

3,732,171
COMPOSITION AND METHOD FOR IRON REMOVAL
Eugene J. Kuhajek, Woodstock, and Gordon H. Tibbitts, Hebron, Ill., assignors to Morton International, Inc., Chicago, Ill.
Filed Sept. 14, 1970, Ser. No. 71,854
Int. Cl. C11d 7/54
U.S. Cl. 252—105        13 Claims

ABSTRACT OF THE DISCLOSURE

A composition and method of removing iron ions from iron-coated or iron-fouled substances, more particularly for removing iron ions from iron-fouled ion exchange resins used in water-treating operations. The composition comprises an alkali metal hydrosulfite and an alkali metal sulfite contributor.

BACKGROUND OF THE INVENTION

Field of the invention

Conventional water treating devices make use of cation exchange resins. Hard water to be treated for removal of various ions is brought into contact with the resin which contains readily exchangeable hydrogen or sodium ions. As the hard water is passed through a bed of the resin, some of the ions causing the hardness, such as calcium and magnesium ions, are removed from the water by the cation exchange resin and are replaced by hydrogen or sodium ions therefrom. When the capacity of the cation exchange resin for removing these hardness-causing ions has been substantially reduced or exhausted, the resin must be regenerated. This is usually done by treatment with brine (an aqueous solution of sodium chloride) which restores the exchange capacity of the resin by replacing hardness-causing ions with sodium ions, thus producing an ionizable sodium salt form of the resin. The regenerated resin then functions on what is referred to as the sodium cycle. Alternatively, the exhausted resin may be regenerated with acid, thereby replacing hardness-causing ions with hydrogen ions, in which case the resin then functions on the hydrogen cycle.

Among the materials causing hardness are iron ions and iron compounds, hereinafter referred to collectively as "iron." Cation exchange resins have a high affinity for iron, hence soluble iron from water becomes strongly attached to active sites in the resin. In addition to the exchange action, soluble iron in water tends to form a rust coating on the surface of the resin beads. Accordingly, wherever iron is present in a water supply, it accumulates both in and on the beads of ion exchange resin used to soften the water, thereby fouling such resins. When the resin beads are thus fouled their exchange properties are significantly diminished. In order to restore the exchange properties of an iron-fouled resin so that it may function properly, the iron must be removed. Removal of even a small portion of the iron opens new sites on the resin so that the ion exchange necessary for the treatment of water may take place.

DESCRIPTION OF THE PRIOR ART

Conventionally the removal of iron deposits from ion exchange resins is accomplished by contacting the iron-fouled resin with a regenerating solution containing sodium chloride and an iron-solubilizing compound. One of the most widely used iron-removing or solubilizing compounds is sodium hydrosulfite ($Na_2S_2O_4$). Conventional treatment with sodium hydrosulfite is limited with respect to the duration of its effectiveness, i.e., the length of time during which it will retain its iron-solubilizing capability in solution. The duration of effectiveness of sodium hydrosulfite is usually only a few hours. Many automatic water softeners used in homes are set to regenerate in the middle of the night. If the rust-removing composition is effective for only a limited time after being added to the regenerating brine, then in instances where the brine is not used promptly its iron-removing effectiveness will be lost.

Various combinations of substances with hydrosulfite have been employed in the past to improve on the iron removal properties of sodium hydrosulfite alone. For example, U.S. Pat. No. 2,995,522 makes use of a composition consisting essentially of 70–90% of an alkali metal hydrosulfite and 10–30% of an alkali metal bisulfite. U.S. Pat. No. 3,183,191 relates to the use of a rust removing composition consisting essentially of 40% sodium hydrosulfite and 60% sodium bisulfite ($NaHSO_3$). Although these combinations improve the immediate rust removing capability of sodium hydrosulfite in water, they do not prolong the $Na_2S_2O_4$ effectiveness beyond a few hours and do not materially reduce the evolution of sulfur dioxide.

Another major problem encountered by the use of sodium hydrosulfite is its continuous evolution of sulfur dioxide and hydrogen sulfide gases. As is well known, sulfur dioxide has a suffocating odor which causes irritation and inflammation of the conjunctiva. More seriously, it is a corrosive and poisonous substance. In fact, concentrations of 6 to 12 parts per million cause immediate irritation of the nose and throat, 50 to 100 p.p.m. is considered to be the maximum permissible concentration for exposures of 30 to 60 minutes, and 400 to 500 p.p.m. is immediately dangerous to life. Hydrogen sulfide is both an irritant and an asphyxiant. Low concentrations of from 20 to 150 p.p.m. cause irritation of the eyes; slightly higher concentrations may cause irritation of the upper respiratory tract, and if exposure is prolonged, pulmonary edema may result. Exposures of 800 to 1000 p.p.m. may be fatal in 30 minutes, and high concentrations are instantly fatal. (Dangerous Properties of Industrial Materials, N. I. Sax, second edition, Reinhold Publishing Corporation, 1963.)

Accordingly, it is an object of the present invention to provide a composition and method having an extended effective life for removing iron from iron-fouled materials, particularly from ion exchange resins used for water treatment.

It is another object of the present invention to provide a composition and method for removing iron from iron-fouled ion exchange resins used for water treatment, while avoiding the generation of sulfur dioxide and/or hydrogen sulfide.

It is still another object to provide an iron removing composition which may be incorporated in a wide variety of industrial and household cleaning compositions.

The fulfillment of these and other related objects of this invention may be more readily appreciated by reference to the following specification, examples, and appended claims.

SUMMARY OF THE INVENTION

This invention relates to the iron removal properties of a composition comprising a combination of an alkali metal hydrosulfite and an alkali metal sulfite contributor, and the conditions of use for said composition. The alkali metal sulfite contributor may be an alkali metal sulfite such as sodium sulfite, potassium sulfite, lithium sulfite or ammonium sulfite, or it may be a combination of an alkali metal metabisulfite and an alkali metal alkaline compound which in aqueous solution provides or contributes an alkali metal sulfite. The alkali metal metabisulfite may be sodium metabisulfite, potassium metabisulfite, lithium metabisulfite, or ammonium metabisulfite or mixtures thereof, while the alkali metal alkaline compound may be sodium hydroxide, potassium hydroxide, lithium hydroxide, ammonium hydroxide, sodium carbonate, potassium carbonate, lithium carbonate, ammonium carbonate, or mixtures thereof.

It was discovered that the aforesaid compositions comprising a combination of an alkali metal hydrosulfite and an alkali metal sulfite contributor, when added to water or brine, display the following twofold enhanced or synergistic activity:

(1) The duration of its effectiveness in removing or solubilizing iron deposits from iron-fouled substances, particularly from iron-fouled ion exchange resins, is prolonged beyond the duration of effectiveness of any of the individual constituents when used alone.

(2) The evolution of noxious sulfur dioxide and/or hydrogen sulfide gases is significantly reduced beyond what can be accounted for by the additive contribution of the alkali metal sulfite contributor.

Thus, for example, sodium hydrosulfite alone loses its iron removing properties in a matter of a few hours whereas the addition of sodium sulfite thereto prolongs the iron removing capability for at least twenty-four hours. In addition, the evolution by sodium hydrosulfite alone of malodorous and toxic sulfur dioxide and/or hydrogen sulfide is significantly reduced and virtually eliminated by the addition of sodium sulfite.

The compositions of the present invention have good reducing properties, which effects the reduction of iron from the ferric to the ferrous state and its subsequent removal from iron-fouled materials. The present compositions are particularly effective for removing iron from particles of ion exchange resin commonly used for water treatment. It was found that as little as about 0.2 part of sodium sulfite per part sodium hydrosulfite provides effective removal of iron, increases the duration of said effectiveness, and diminishes or virtually eliminates sulfur dioxide and hydrogen sulfide generation.

The compositions of the present invention may be used in water or in brine solutions usually used for regeneration of the ion exchange resins used in water-treating systems. Additionally, they may be used as components of dry industrial or household detergents and cleaning compositions which are used subsequently in an aqueous medium.

As hereinbefore stated, a combination of an alkali metal metabisulfite and an alkali metal alkaline compound may be used in lieu of sodium sulfite. For example, sodium metabisulfite plus sodium hydroxide yields sodium sulfite and water according to the equation:

$$Na_2S_2O_5 + 2NaOH \rightarrow 2Na_2SO_3 + H_2O$$

It is obvious from this equation that a combination of 0.755 gram of sodium metabisulfite plus 0.317 gram of sodium hydroxide is equivalent to and can replace 1 gram of sodium sulfite for the purpose of this invention.

Although the alkali metal hydrosulfite and the alkali metal sulfite contributor are hereinafter referred to and exemplified as sodium hydrosulfite and sodium sulfite respectively, any of the aforementioned compounds or combinations thereof may be substituted therefor as indicated.

The process of the present invention for removing iron from an iron-fouled substance comprises contacting said iron-fouled substance with an aqueous solution containing a mixture of the aforesaid alkali metal hydrosulfite and an alkali metal sulfite contributor, for example, an aqueous solution containing sodium hydrosulfite and sodium sulfite. In the instance where the iron-fouled substance is a sodium exhausted ion exchange resin which requires regeneration by brine, it is convenient to add the composition of the present invention directly to the brine. The resultant brine-hydrosulfite-sulfite solution is then circulated through the exhausted iron-fouled resin bed thereby achieving the dual purpose of regenerating the resin and removing iron in a single operation.

In one preferred embodiment of the composition of the present invention, the iron-removing composition comprises an admixture of sodium hydrosulfite and sodium sulfite containing from about 0.2 to about 2.0 parts sodium sulfite per part sodium hydrosulfite. The concentration of said admixture in a brine solution may be from about 0.1% weight to about 1% by weight depending on the quantity of iron present on the resin, whereas in an aqueous solution for use in removing iron from a substance other than an ion exchange resin the concentration may be as much as 10% or more by weight. As hereinbefore stated, the iron-removing property of such combinations in water is prolonged for at least 24 hours and is of a much longer duration than any of its components taken separately. In addition, the evolution of sulfur dioxide and/or hydrogen sulfide is greatly decreased.

For a more complete understanding of the present invention, reference is now made to the following specific examples illustrating the novel compositions and process of this invention.

DESCRIPTION OF THE PREFERRED EMBODIMENTS

Example 1

A sample of sodium exhausted, iron-fouled ion exchange resin was air-agitated and backwashed with water to remove all loose iron prior to treatment. An aqueous treating and regenerating solution was prepared containing 10% by weight of sodium chloride and 0.1% by weight of sodium hydrosulfite. The sulfur dioxide odor of the solution was noted and rated on a scale of 1 to 10 where 1 represents no odor and 10 represents an extreme odor. Six hundred and twenty five milliliters of this treating solution at ambient temperature were passed through a 125 gram portion of said iron-fouled resin for 30 minutes to regenerate same and to remove iron therefrom. The iron content of the effluent was thereafter determined to obtain the number of milligrams of iron which was removed from the resin by the immediate use of the treating solution.

A treating solution prepared as above was allowed to stand for 24 hours, after which time this solution was circulated as before through a second 125 gram portion of the same iron-fouled resin. The iron content of the effluent was determined to obtain the number of milligrams of iron removed by the aged treating solution. The results were as follows:

Milligrams of iron removed by immediate use of the
   treating solution _____ 35
Milligrams of iron removed after 24 hour delay in use
   of the treating solution _____ 0
Sulfur dioxide odor rating of fresh solution _____ 10

Example 2

The procedure of Example 1 was repeated with the exception that the treating solution consisted of a brine solution containing 10% by weight of sodium chloride and 0.1% by weight of sodium sulfite. The results were as follows:

Milligrams of iron removed by immediate use of the
   treating solution _____ 1
Milligrams of iron removed after 24 hour delay in use
   of the treating solution _____ 0
Sulfur dioxide odor rating of fresh solution _____ 1

Example 3

The procedureof Example 1 was repeated with the exception that the treating solution consisted of a brine solution containing 10% by weight sodium chloride, 0.1% by weight of sodium hydrosulfite and 0.02% by weight of sodium sulfite. The results were as follows:

Milligrams of iron removed by immediate use of the treating solution _____ 37
Milligrams of iron removed after 24 hour delay in use of the treating solution _____ 10
Sulfur dioxide odor rating of fresh solution _____ 8

Example 4

The procedure of Example 1 was repeated with the exception that the treating solution consisted of a brine solution containing 10% by weight sodium chloride, 0.1% by weight sodium hydrosulfite, and 0.032% by weight of sodium sulfite. The results were as follows:

Milligrams of iron removed by immediate use of the treating solution _____ 34
Milligrams of iron removed after 24 hour delay in use of the treating solution _____ 28
Sulfur dioxide odor rating of fresh solution _____ 5

Example 5

The procedure of Example 1 was repeated with the exception that the treating solution consisted of a brine solution containing 10% by weight sodium chloride, 0.1% by weight sodium hydrosulfite and 0.1% by weight sodium sulfite. The results were as follows:

Milligrams of iron removed by immedate use of the treating solution _____ 33
Milligrams of iron removed after 24 hour delay in use of the treating solution _____ *34
Sulfur dioxide odor rating of fresh solutions ____ 3

*The experimental error in the determination of iron content is of the order of magnitude of ±2 milligrams.

Example 6

The procedure of Example 1 was repeated with the exception that the treating solution consisted of a brine solution containing 10% by weight sodium chloride, 0.1% by weight sodium hydrosulfite and 0.2% by weight sodium sulfite. The results were as follows:

Milligrams of iron removed by immediate use of the treating solution _____ 31
Milligrams of iron removed after 24 hour delay in use of the treating solution _____ 30
Sulfur dioxide odor rating of fresh solution _____ 2

The results of Examples 1–16 are set forth in Tables I and II.

TABLE I

| Example | Percent $Na_2S_2O_4$ | Percent $Na_2SO_3$ | Total | Ratio, parts $Na_2SO_3$ per part $Na_2S_2O_4$ | Initial mgs. Fe removed | Mgs. Fe removed after 24 hrs. | Expected Fe removal after 24 hrs. (mgs.) | Synergism [1] (after 24 hrs. delay in use) | Percent Synergism [2] | Percent Retention of effectiveness, 24 hrs. delay [3] |
|---|---|---|---|---|---|---|---|---|---|---|
| 1 | 0.10 | 0 | 0.10 | | 35 | 0 | | | | |
| 2 | 0 | 0.10 | 0.10 | | 1 | 0 | | | | |
| 3 | 0.10 | 0.02 | 0.12 | 0.2:1 | 37 | 10 | 0 | 10 | ∞ | 27 |
| 4 | 0.10 | 0.032 | 0.132 | 0.3:1 | 34 | 28 | 0 | 28 | ∞ | 82 |
| 5 | 0.10 | 0.10 | 0.20 | 1:1 | 33 | [4]34 | 0 | 34 | ∞ | [4]103 |
| 6 | 0.10 | 0.20 | 0.30 | 2:1 | 31 | 30 | 0 | 30 | ∞ | [4]97 |

[1] Synergism.—The figures in this column are a measure of synergism and represent the increase in the number of milligrams of iron removed by the use of the indicated combinations of sodium hydrosulfite and sodium sulfite after a 24 hour delay in use as compared to the expected removal after 24 hours based on the additive contributions of each of the components taken alone.
[2] Percent synergism.—These figures are computed by dividing the increase in iron removal (synergism) obtained by use of the combination of sodium hydrosulfite and sodium sulfite by the expected iron removal and multiplying by 100.
[3] These figures are computed by dividing the number of milligrams of iron removed by each combination after a delay in use of 24 hours by the number of milligrams of iron removed upon immediate use and multiplying by 100.
[4] The experimental error in the determination of iron content is of the order of magnitude of ±2 milligrams.

TABLE II

| Ex. | Percent Sodium hydrosulfite | Percent Sodium sulfite | Total | Actual sulfur dioxide odor [2] | Expected sulfur dioxide odor | Synergism [1] (decrease in sulfur dioxide odor) | Percent synergism [3] |
|---|---|---|---|---|---|---|---|
| 1 | 0.10 | 0 | 0.10 | 10 | | | |
| 2 | 0 | 0.10 | 0.10 | 1 | | | |
| 3 | 0.10 | 0.02 | 0.12 | 8 | (0 | 2 | 20 |
| 4 | 0.10 | 0.032 | 0.132 | 5 | 10 | 5 | 50 |
| 5 | 0.10 | 0.10 | 0.20 | 3 | 10 | 7 | 70 |
| 6 | 0.10 | 0.20 | 0.30 | 2 | 10 | 8 | 80 |

[1] Syngerism.—The figures in this column reflect the decrease in sulfur dioxide odor obtained by the indicated combinations of sodium hydrosulfite and sodium sulfite when compared to the expected odor.
[2] The odor generated is rated on a scale of 1–10; 1 represents no odor and 10 represents extreme odor.
[3] Percent synergism.—These figures are computed by dividing the decrease in sulfur dioxide (synergism) by the expected sulfur dioxide and multiplying by 100.

Referring to Table I, it is seen that either sodium hydrosulfite or sodium sulfite, each taken separately after aging an aqueous solution thereof for 24 hours, has no iron removing capability. However, the effectiveness of sodium sulfite in preserving the iron-removing property of an aqueous solution of sodium hydrosulfite is illustrated by comparing Examples 3, 4, 5, and 6 with Example 1. It is seen that the retention of effectiveness by the indicated synergistic combinations ranges from about 27 to about 100 percent. The quantity of iron removed by the use of 24 hour-aged treating solutions containing both sodium hydrosulfite and sodium sulfite is much greater than would be expected or than can be accounted for by the additive contributions of the individual components.

FIG. 1 depicts graphically the percent retention of iron removing effectiveness after a 24 hour delay in the use of the compositions of Examples 3, 4, 5 and 6. The percent retention of effectiveness is plotted along the ordinate and the respective parts of sodium sulfite per part of sodium hydrosulfite are plotted along the abscissa. It is obvious from this graph that the use of as little as about 0.2 part sodium sulfite per part sodium hydrosulfite provides a synergistic prolonged enhancement of iron removal. The use of more than about 2 parts of sodium sulfite per part of sodium hydrosulfite adds relatively little to the retention of effectiveness while increasing the cost. Therefore, although the use of sodium sulfite to provide a ratio of sodium sulfite to sodium hydrosulfite in excess of 2:1 is operable, such excess is inadvisable from an economic point of view.

Referring to Table II, the significant reduction in sulfur dioxide odor noted in the instance of the indicated combination of sodium hydrosulfite and sodium sulfite is unexpected and surprising in view of the sodium hydrosulfite component which by itself in the indicated concentration gives rise to an extreme sulfur dioxide odor.

The results demonstrate the synergistic effect of combinations of sodium hydrosulfite and sodium sulfite in prolonging the iron-removing capability of sodium hydrosulfite beyond its normal duration and in reducing the evolution of sulfur dioxide.

Example 7

To a brine solution containing 10% by weight of sodium chloride was added 0.1% by weight of a combination of sodium hydrosulfite and sodium sulfite containing 0.33 part by weight of sodium sulfite to 1 part by weight of sodium hydrosulfite to prepare a regenerating and iron-removing solution. Six hundred and twenty-five milliliters of this treating solution were passed through a 125 gram portion of an iron-fouled, sodium-exhausted ion exchange resin (different from the resin used in Examples 1–6) according to the procedure described in Example 1. After treatment, the effluent was analyzed for iron content to determine the weight of iron removed from the resin.

The above procedure was repeated three more times with the exception that 0.2, 0.3 and 0.5 percentages by weight respectively of the same combination of sodium hydrosulfite and sodium sulfite were employed. The results are set forth in Table III.

Table III

[Composition consisting of—0.33 part sodium sulfite per part sodium hydrosulfite]

| Composition—percent by weight in 10% brine: | Milligrams iron removed |
|---|---|
| 0.1 | .75 |
| 0.2 | 112 |
| 0.3 | 122 |
| 0.5 | 156 |

Example 7 illustrates that the addition to brine of as little as 0.1% by weight of a composition consisting essentially of 0.33 part of sodium sulfite per part sodium hydrosulfite provides a solution which is effective in removing iron deposits from iron-fouled ion exchange resins. It is seen that increasing the concentration in brine of the hydrosulfite-sulfite combination from 0.1% to 0.5% by weight results in increased iron removal. This is depicted graphically in FIG. 2 where the number of milligrams of iron removed is plotted along the ordinate and the respective percentages of the hydrosulfite-sulfite composition are plotted along the abscissa. As is evident from the graph, an increase in the concentration of the hydrosulfite-sulfite composition beyond 0.5% while adding to the cost of the process, would not materially increase the quantity of iron removed.

It is understood, of course, that the composition of the present invention finds use in removing iron deposits from a variety of objects other than ion exchange resins. When so used, the concentrations in water may range up to about 10% or more by weight, depending on the extent of iron deposition, although the expense of using high concentrational levels should be balanced against the iron-removal efficiency.

What is claimed is:

1. A composition for preparing an aqueous solution for removing iron from iron-fouled substances, said composition consisting essentially of an alkali metal hydrosulfite and an alkali metal sulfite contributor selected from the group consisting of an alkali metal sulfite and combinations of an alkali metal metabisulfite with an alkali metal alkaline compound, the proportion of alkali metal sulfite being at least about 0.2 part per part of alkali metal hydrosulfite and the proportions of combinations of alkali metal metabisulfite and an alkali metal alkaline compound being selected to provide per part of said alkali metal hydrosulfite at least about 0.2 part by weight of an alkali metal sulfite.

2. The composition of claim 1 wherein the alkali metal hydrosulfite is sodium hydrosulfite and the alkali metal sulfite contributor is sodium sulfite.

3. The composition of claim 1 wherein the alkali metal sulfite contributor is a combination of sodium metabisulfite and sodium hydroxide.

4. The composition of claim 1 wherein the ratio of the alkali metal sulfite contributor to alkali metal hydrosulfite is from about 0.2:1 to about 2:1.

5. A composition for preparing an aqueous solution for removing iron from an iron-fouled ion exchange resin, said composition consisting essentially of sodium hydrosulfite and sodium sulfite in the ratio of from about 0.2 part to about 2 parts of sodium sulfite per part of sodium hydrosulfite.

6. An aqueous solution for removing iron from an iron-fouled ion exchange resin, said solution containing at least about 0.1% by weight of a mixture consisting essentially of sodium hydrosulfite and sodium sulfite, said sodium sulfite being present in the ratio of at least about 0.2 part per part of sodium hydrosulfite.

7. The composition of claim 6 wherein the solution contains by weight from about 0.1% to about 10% of a mixture consisting essentially of sodium hydrosulfite and sodium sulfite, and the sodium sulfite is present in the ratio of from about 0.2 part to about 2 parts per part of sodium hydrosulfite.

8. An aqueous solution for treating a sodium exhausted, iron-fouled ion exchange resin to regenerate same and remove iron therefrom, said solution containing at least about 5% by weight of sodium chloride and at least about 0.1% by weight of a mixture consisting essentially of sodium hydrosulfite and sodium sulfite, said sodium sulfite being present in the ratio of at least about 0.2 part per part of sodium hydrosulfite.

9. The composition of claim 8 wherein the sodium sulfite is present in the ratio of from about 0.2 part to about 2 parts per part of sodium hydrosulfite.

10. A method of removing iron from iron-fouled materials which comprises contacting said fouled materials with an aqueous solution containing at least about 0.1% by weight of a mixture consisting essentially of sodium hydrosulfite and an alkali metal sulfite contributor selected from the group consisting of alkali metal sulfites and combinations of an alkali metal metabisulfite with an alkali metal alkaline compound, said alkali metal sulfite contributor being present in the ratio of at least about 0.2 part per part of sodium hydrosulfite.

11. The method of claim 10 wherein the alkali metal sulfite contributor is a combination of sodium metabisulfite and sodium hydroxide.

12. The method of claim 10 wherein the alkali metal sulfite contributor is sodium sulfite.

13. A method of treating a sodium exhausted iron-fouled ion exchange resin to regenerate same and remove iron therefrom, said method comprising contacting said resin with an aqueous solution containing at least about 5% by weight of sodium chloride and at least about 0.1% by weight of a mixture consisting essentially of sodium hydrosulfite and sodium sulfite, said sodium sulfite being present in the ratio of at least about 0.2 part per part of sodium hydrosulfite.

References Cited

UNITED STATES PATENTS

| | | | |
|---|---|---|---|
| 3,183,191 | 5/1965 | Hach | 252—105 |
| 2,995,522 | 8/1961 | Joyce | 252—105 |
| 3,262,883 | 7/1966 | Fisher | 252—188 X |
| 3,669,895 | 6/1972 | Shastri | 252—105 X |

MAYER WEINBLATT, Primary Examiner

U.S. Cl. X.R.

252—175, 179, 188; 23—116; 210—32